(No Model.)
R. J. TARBELL.
FLY TRAP AND SCREEN FOR WINDOWS AND DOORS.
No. 363,861. Patented May 31, 1887.
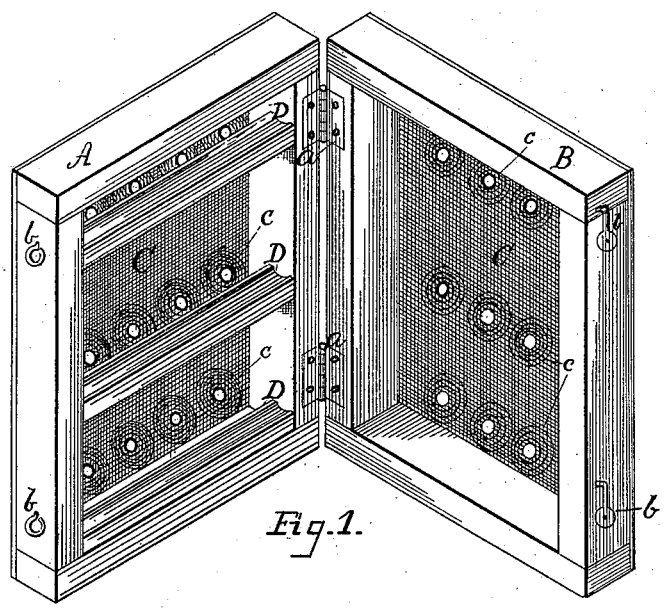
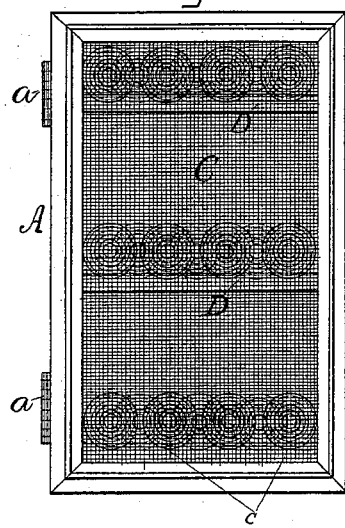
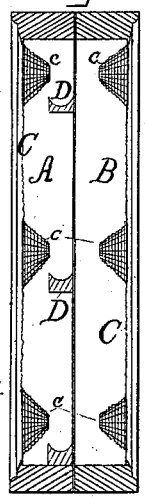
WITNESSES
INVENTOR
Reuben Jay Tarbell
by Henry Wise Garnett
Attorney

UNITED STATES PATENT OFFICE.

REUBEN J. TARBELL, OF SOLOMON CITY, KANSAS.

FLY TRAP AND SCREEN FOR WINDOWS AND DOORS.

SPECIFICATION forming part of Letters Patent No. 363,861, dated May 31, 1887.

Application filed September 11, 1886. Serial No. 213,304. (No model.)

*To all whom it may concern:*

Be it known that I, REUBEN JAY TARBELL, a citizen of the United States, residing at Solomon City, in the county of Dickinson and State of Kansas, have invented certain new and useful Improvements in Combined Fly Traps and Screens for Doors and Windows; and I do hereby declare the following to be a full, clear, and exact description of the invention, such as will enable others skilled in the art to which it appertains to make and use the same.

My invention relates to combined door and window screens and fly-traps; and my said invention consists in a combined fly screen and trap for the doors and windows of dwellings, composed of two frames hinged together and each covered upon opposite sides with wire-netting, one or both of which is formed with a series of separate and distinct horizontally-projecting cones having small openings in their apexes, arranged with their said apexes facing each other, so as to form a trap that will retain such flies as may enter between said screens, as and for the purposes as will be hereinafter more fully explained, and pointed out in the claims.

This invention has a twofold purpose—that of, while permitting the free egress from the room of such flies as may accidentally gain an entrance to the dwelling, catching and retaining not only such flies as may be in the room and attempt to escape therefrom through the screen, but those that attempt to enter the room are caught as well, or the device may be used simply in the form of a small portable trap, instead of as a combined window-screen and trap, which, when properly baited and set within rooms, will attract the flies in said room thereto and retain them therein.

For a better understanding of the details of construction and arrangement of my invention reference must now be had to the accompanying drawings, in which—

Figure 1 represents a view in perspective of a combined door or window screen and fly-trap constructed in accordance with my invention, the same being shown as in its open position for baiting or cleaning the same. Fig. 2 represents a face view illustrating the same as in its closed position, and Fig. 3 is a vertical central sectional elevation thereof.

In carrying out my invention I proceed as follows: Upon the face or front of two rectangular frames, A and B, which may be of any desired or appropriate dimensions and thickness, and to either snugly fit within the recess of a door or window casing or simply as a small portable device, is secured wire-netting C C. These frames A and B are, as shown at *a*, hinged at one edge together and provided with fastening hooks and eyes, as at *b*, whereby they may be securely retained in a closed position when desired for use or opened for baiting and cleaning. Transversely across either one or both of the frames A and B are arranged shallow troughs D, for holding the bait or food for the flies, and the wire-netting C C are each formed with a series of cone-shaped entrances, *c*, each separate and independent of the other and facing inward and toward each other, and preferably arranged in horizontal rows transversely across the same, with their apexes terminating adjacent the troughs D. If desired, however, the cones upon each of the frames A and B may be arranged in lines parallel to and directly opposite each other; or they may be arranged irregularly, and as alternating one with the other, if found to accomplish better results. The height, as well as the base or mouth of these cones, may be of any desired or appropriate size and diameter; but the exit-opening at the apex of the cone must only be sufficient to admit the body of a fly, and any number of said cones may be employed.

This completes the construction of the device when used as a trap or combined door or window screen and trap; and to use the same it is either made of a size to closely fit within the door-frame, where it is hinged to the door-jamb as usual with door-screens, or to fit and slide within a window-frame, as usual with ordinary window-screens, in which positions it will catch such flies as attempt to enter the room, as well as such as having otherwise entered attempt to escape; or, when desired for use simply as a portable trap, it is made of various sizes, and, after being baited by placing food within the troughs, is set around the room to allure and retain flies therein.

If desired, only the inside screen may be formed with the cone-shaped openings and the outside one remain plain, as usual, when only such flies as are in the room and attempt to escape are caught and not those on the outside; and the feed-troughs may be dispensed with, or only employed when using the device as a portable trap.

The operation is the same, whether the device be used simply as a screen or trap—that is, the flies in walking over the surface of the screen will be directed within and pass through the cone-shaped openings thereof, whence they cannot readily return, because of the difficulty in passing up the cones and inaccessibility of the opening at the ends thereof.

Having thus fully described my invention, what I claim as new therein, and desire to secure by Letters Patent of the United States, is as follows, viz:

1. A combined fly screen and trap for doors and windows, composed of the two frames A and B, hinged together, wire-netting C C, covering opposite sides of said frames, and series of horizontally-projecting cones $c\ c$, each separate and independent of the other, formed at intervals across one or both said screens C, and with small holes in their apexes, which face toward each other, substantially as described and shown, for the purposes specified.

2. A fly-trap composed of the two frames A and B, hinged together, wire-netting C C, covering opposite sides of said frame, a series of separate and independent horizontally-projecting cones, $c\ c$, formed at intervals across both said screens C C, with small holes in their apexes, which face toward each other, and the baiting-troughs D, substantially as described and shown, for the purposes specified.

R. J. TARBELL.

Witnesses:
C. H. DEWAR,
JOHN L. GUY.